Jan. 16, 1945.   H. A. BRASSERT   2,367,262
PROCESS FOR PRODUCING METALS
Filed April 9, 1941   3 Sheets-Sheet 2

INVENTOR.
Herman A. Brassert,
BY

Jan. 16, 1945.  H. A. BRASSERT  2,367,262
PROCESS FOR PRODUCING METALS
Filed April 9, 1941  3 Sheets-Sheet 3

INVENTOR.
Herman A. Brassert,
BY

Patented Jan. 16, 1945

2,367,262

UNITED STATES PATENT OFFICE 2,367,262

PROCESS FOR PRODUCING METALS

Herman A. Brassert, Rye, N. Y., assignor to Minerals and Metals Corporation, New York, N. Y., a corporation of Delaware Application April 9, 1941, Serial No. 387,708

10 Claims. (Cl. 75—34)

This invention relates to a new and improved process for producing metals or metallic stock suitable for melting, from ores or other oxides and compounds of metals.

While this new process is particularly applicable to iron ores, it may be utilized in the treatment of the ores of other metals, such as for example copper, zinc, lead, tin and many others. By the term "ores" as used in this specification is meant oxides of metals in any form of combination, such as carbonates of metals, silicates, aluminates or any other chemical or physical compounds in which the metals are found in nature, as well as metal bearing slags or other waste materials produced in the industries, such as flue dust made in the iron blast furnace.

Many processes have been suggested and tried out for the direct reduction without melting of metals from their ores, particularly of sponge iron from iron ores. While several methods have been successful in producing small quantities of the desired product, none have been capable of producing the reduced metals in quantities remotely comparable to the tonnages made by the ordinary steel processes where the ores are smelted in blast furnaces in units producing as much as 1,000 tons of iron a day and the subsequent steel processes and rolling mills convert the enormous tonnages from a number of such furnaces into steel and finished products.

There are definite reasons why direct reduction without melting has not been successful for tonnage production. The difficulties lie in the fact that at temperatures sufficiently high to carry out reduction in a short time cycle particles of reduced ore are caused to frit together and to stick to any surfaces of the apparatus they come in contact with, forming obstructions and unwieldy masses which prevent the continuous operation of the process. At the lower temperatures where this agglomerating, fritting and sticking does not take place, the process of reduction progresses much more slowly, preventing large productions without uneconomical enlargement of the equipment of the apparatus. I have overcome these difficulties in this invention which carries out in a practical form the broad objects of my prior invention set forth in application Serial No. 316,717, filed February 1, 1940, now Patent No. 2,252,697.

This improved process comprises a series of interlocked steps, each under temperature and atmosphere control and utilizing to the greatest possible extent the heat of the prior step and the reducing power of the gases. Preferably the process consists of a preheating and roasting step by downdrafting hot oxidizing gases, a primary reducing step by downdrafting hot reducing gases at relatively low temperatures through a bed of ores, a finishing reducing step to complete reduction at a higher temperature and a compacting step to work the reduced hot material into solid bodies which may be followed by melting or by reheating and forming into finished products. The primary reduction cycle takes place at relatively low temperatures in order to prevent interruptions by too much fritting of the ore particles together and onto the surfaces of the apparatus with resulting clogging of the permeable hearth and formation of unwieldy sintered masses which cannot be removed without interrupting operations. The reduction therefore at the lower temperatures may not proceed to more than about 90% of completeness, but is carried further in the final step where under continued reducing atmosphere and preferably higher temperatures and by mechanical compacting reduction is carried substantially to completion or to the degree desired for the subsequent steps of melting or directly shaping finished products. The final step of reduction is preferably carried on in a separate heated chamber in a reducing atmosphere and, if necessary, at elevated temperatures and immediately precedes compacting of the hot metallic material into desired forms. At no stage in the roasting and reducing cycles of this process must the temperature reach the melting point of the unreduced or partially reduced compounds or that of the reduced metals.

In carrying out the invention, the ores which are either of a high degree of purity or have been beneficiated or enriched by the removal of gangue as completely as is commercially possible are bedded on a grated or otherwise permeable stationary or moving hearth to a suitable depth up to several feet in thickness according to size and character of the ore and the available suction and then preheated and roast by downdrafting hot air and/or combustion gases through the bed. This is the first cycle of the operation. There are certain ores in which the roasting cycle can be omitted, for instance hematites of great purity which do not need to be made magnetic by roasting for separation of gangue and which are in their finely divided state very easily reduced. But most ores, for instance magnetites, hard specular hematites or hematites which need to be made magnetic for the removal of gangue before reduction or carbonates and ores with considerable amounts of chemically bound water or ores containing pyrites and other sulphur compounds and other elements or impurities which can be driven off by such treatment are roasted before reduction. In some cases a small amount of carbonaceous fuel, preferably 2 or 3% only or even less, may be mixed with the ore in order to cause partial sintering, the combustion of the carbon causing a temporary local rise of temperature within the progressing horizontal seam in which combustion of the carbon takes place. The amount of carbon added should be only sufficient to sinter the smallest particles and thereby increase the minimum particle weight in order to decrease dust losses during the roasting as well as the subsequent reduction cycle. Or the carbon addition may be spread over the top of the bed to be ignited by air and furnish the initial preheat. The normal roasting medium is air which should be preheated to the highest degree which is practical from the economical standpoint but preferably to not less than 1200 degrees F. The air can be mixed with or entirely replaced by oxidizing gases of combustion, for instance such as can be produced by burning spent gases of the reduction cycle above the bed and downdrafted with a substantial amount of excess air through the bed.

The roasting step or cycle is carried on at relatively low temperatures to prevent excessive sintering but at temperatures sufficiently high for the rapid drying, calcining, desulphurizing or driving off of other objectionable elements which can be volatilized rapidly at relatively low temperatures and by free and even circulation of the oxidizing gases through the ore. The temperature must be so controlled that substantially no melting of the metal compounds takes place and that sintering or clinkering of the particles into masses is avoided excepting possibly the finest particles which are heated and soften most quickly and may then agglomerate into larger particles by fritting together or stick to the surfaces of other softening particles which they pass as they are pulled through the bed by the hot gases.

While the air and/or oxidizing gases are preferably downdrafted through the ore, it is understood that the gases may also be forced downward through the ore under pressure or pulled upward by suction or blown upward under pressure. Passing the oxidizing gases downward has the advantage over the upward flow that a better distribution of gases and heat will result. Forcing gases downward through a bed of hot materials causes them to seek and follow the cooler passages, thereby counteracting the tendency of channelling within the bed, which takes place particularly if carbon or other combustible solids are present, the elimination of which may cause shrinkage cracks in the hottest local regions. Forcing the hot gases upward would cause them to seek and follow such hotter channels and to enlarge them by sweeping the finer particles out of the bed with them, whereas by forcing them downward distribution of gases and heat is continuously equalized. Passing the gas downward through the bed of materials has the further substantial advantage that the fines are trapped by the layer of materials deposited on the grates for this purpose and the consequence of high dust content in the exhaust gases is avoided or at least greatly reduced. Dust in the exhaust gases causes loss of material or requires expensive apparatus for recovering the dust and recycling it. Keeping the process under suction prevents the escape of poisonous gases. The downdrafting method, both during the roasting and subsequent reducing cycle, is for these reasons highly advantageous from the standpoint of economical and practical operation.

The reducing step follows the roasting step immediately, retaining the heat which has been accumulated in the ores by the passage of hot air and hot combustion gases through them and/or by the combustion of carbon and sulphur or other combustible elements contained in the bed of ores. The material remains bedded and is not removed from the grates between the two steps unless it is desired after the roasting step to pass the material over magnetic separators. In that case the ore must be cooled down to within the limits of magnetic permeability before reduction, requiring discharging, handling and recharging the ores between the roasting and reducing steps but normally magnetic concentration, if necessary, precedes the roasting step as for instance with all magnetites and with blast furnace flue dust in which the greater part of the iron oxides are magnetic if taken directly from the blast furnace dust catchers. Therefore, the material is normally not handled between the steps but is treated for reduction in the same bed in which it has been roasted while it is still hot. A small amount of solid fuel may also be added during or before the reducing step in the form of finely divided carbon carried by the gases or spread on top of the bed. Alkalies, such as soda ash, may be charged on top of the roasted ore in order to promote reduction which is accelerated and carried to a higher degree, temperatures and other conditions remaining equal, by the action of alkaline fumes on the reducing oxides.

The preferable fuel gases for the reducing cycle are gases essentially free from sulphur and containing sufficient carbon monoxide or hydrogen or both for rapid reduction of the ores. Blast furnace gas, coke oven gas, natural gas, oil gas, producer or water gas can all be used either alone or in mixtures. Gases containing hydrocarbons may be reformed to prevent carbon deposition upon reaching sufficiently high temperatures for these compounds to decompose. However, in the working of this process where the openings in the hearth grates can be inspected and cleaned without interrupting operations, the reforming is not as essential as in processes where depositions of carbon cannot be removed without stopping the operation. Carbon deposited on the ores from the gases is highly reactive and assists effectively in their reduction. It is clear that any mixture of gases can be used and that the spent gases from the process may be continuously passed through a reheated and/or an incandescent coke bed for reforming with or without steam; for instance, a continuous slagging gas generator can be used for this purpose, or any other suitable gas generator.

While the spent reducing gases are thus recycled through the process a portion of these gases may be taken to supply the requirement of combustion gases for the roasting cycle and for preheating of air, another part to supply the heat for the recuperation or preheating of the reducing gases and another part for heating the reduced material before compacting. At the same time sufficient new gas or gasified liquid or solid fuel in the natural state, or reformed, is continuously added to the cycle to maintain the required reducing power of the gases.

If carbon is mixed with the ore for the roasting as well as the reducing steps, it can be in the form of fine coke, coke dust, charcoal, anthracite, lamp black, powdered pitch or any other finely divided solid fuel, low in sulphur and ash. It is evident that the less solid fuel is added, the purer is the resulting metallic product. In this process the addition of carbon is not as essential as it is in sintering and for most ores it will be found undesirable. If it is used, its amount can be decreased in the roasting cycle by passing a larger amount of combustion gases or hotter gases or both through the bed, thus replacing heat otherwise produced by combustion of the carbon. The amount of carbon used for reduction can also be decreased or eliminated by higher preheat of the reducing gases and by downdrafting along with the reducing gases a greater amount of neutral highly heated combustion gases through the bed.

The easier the raw material may be reduced, the larger may be the grain size. It is advantageous to operate with a larger grain size, for instance not less than 40 mesh, as it renders the bed more easily permeable and allows for coarser openings in the grates. However, larger grain size can only be employed if the ores are readily reducible, and therefore the first operation, that of roasting, is of great value even with many hematite ores.

It will be understood that the material produced by this method will be a metallic stock with its metal component in a high state of purity, and which will make a superior quality of iron or steel, whether used for melting in the open hearth or other metallurgical furnaces or whether it is worked directly into billets or other semi-finished forms for subsequent shaping into finished products, without ever being molten. To insure the high quality of the finished material the temperature of the bed in the roasting, as well as in the reducing cycle is in this process never raised to the melting point of the metals, and there is, therefore, no opportunity for molten metal to absorb impurities from the gangue, as occurs in shaft or other metallurgical furnaces in which ore is smelted. In the case of reduction of iron ores, the temperature in the reducing cycle will not reach degrees sufficiently high to reduce phosphorus or silicon into the metal, nor will carbon and sulphur be absorbed into the metal from the fuel, as occurs in the blast furnace, where the iron becomes molten and saturates itself with carbon from the coke, at the same time picking up a considerable portion of its sulphur content. In this invention it is intended to use substantially sulphur free fuels and the temperatures are kept below the melting point of the metals, so that the absorption of sulphur by the metal grains is substantially avoided; nor will the metal become charged with occluded gases, oxides of metals and metalloids, and undesirable compounds. The gangue impurities contained in the ore will by this method of converting them into metallic products remain separately from the metal as gangue, and as such they can be removed in a subsequent melting step by dissolving them in the first slag made under oxidizing conditions, for instance in the open hearth process, or under neutral atmosphere as in the electric induction furnace; this slag can then be tapped off before the heat is finished. Nevertheless, it is advantageous to provide ores for this process which are low in gangue matter, as it would be uneconomical to unduly increase the slag volume in the steel melting furnace. By this method iron and steel containing only traces of phosphorus can be produced, and if substantially sulphur-free ores and gases are used in the reduction cycle, steels can be made with a lower sulphur content than is possible with the existing commercial methods.

It is an object of the present invention to provide a process for producing metallic material of high purity directly from the ores by downdrafting first oxidizing gases, then reducing gases through them and then melting the reduced metallic product under oxidizing or neutral conditions for the removal of the gangue content of the ores.

It is a further object to bring about the reduction of ores at temperatures and other conditions which prevent the absorption of P, Si, C, oxides and gases in the metallic component produced.

It is a further object to provide a process of this character comprising successive steps of roasting and reduction of a stationary or moving bed of ore which may be carried out in the same apparatus without intermediate handling and consequent loss of heat of the material being treated.

It is another object to provide such a process which may be carried out in apparatus having a bed or hearth for the material, which bed or hearth is readily accessible for purposes of cleaning and maintenance.

It is also an object to provide a process by means of which the temperatures of the roasting and reducing steps or cycles are under continuous control which may, if desired, be subjected to automatic control.

It is an additional object to provide a process of reduction of ores which may be operated on perforated, slotted or permeable hearths by means which permit the removal during the operation of any obstructions caused by the reduced particles sticking together and to the hearth and other parts of the apparatus.

It is another object to provide a method by means of which the roasting cycle may be carried on at local temperatures within the ore bed sufficiently high to cause fine particles to frit together and to stick to softening surfaces of larger particles, thereby reducing dust losses.

It is a further object to provide control of the temperature during the roasting cycle prior to the reduction of the ore, so that the temperature remains below that of the formation of silicates of the metals which are difficult to reduce.

It is also an object to provide a process whereby heat remaining from the roasting cycle in the bed of material being treated, is made available in the subsequent reducing cycle.

It is a further object to provide a process in which the roasting cycle may be carried out under suction, downdrafting through the bed, which facilitates even distribution of gases and reduces dust losses and in which the reducing cycle may be carried on either under partial vacuum by up or downdrafting or under pressure by up or downblowing the reducing gases through the bed.

It is an additional object to provide a process by which heat from the gaseous products of the roasting step may be returned to the process by the gases used in the reducing step or cycle and in which the reducing step may be carried out by the continuous recirculation of spent reducing gases through the bed with the addition of heat and thermal value to the gases.

It is another object to provide a process including the recirculation of the spent gases with the addition of fresh gases and after reforming all or a part of the spent gases.

It is a further object of the invention to provide a method for reducing ores by downdrafting reducing gases through them at temperatures below those at which the reduced metallic particles frit together and form large and unwieldly masses and thereafter raising the temperature sufficiently to substantially complete reduction and form solid metallic bodies by compression.

It is also an object to provide a method in which distribution and contact between gases and solids may be assisted by agitating the bed of material during the action of the gases.

It is a further object to provide a method whereby the temperature of the reduced material is maintained and preferably increased during a successive step of forming the material and shaping it preferably while still under a reducing atmosphere.

It is a further object to provide a method whereby the ores to be treated may be bedded in successive layers of uniform size but different composition and physical character.

It is also an object to provide a method whereby special materials, such alkalies which promote reduction, may be placed on top of the ore bed, preferably after roasting and downdrafted through the bed with the hot gases as fumes.

Other and further objects will appear as the description proceeds.

I have shown somewhat diagrammatically in the accompanying drawings, certain preferred embodiments of apparatus adapted for carrying out my improved process. In the drawings—

Figure 1:
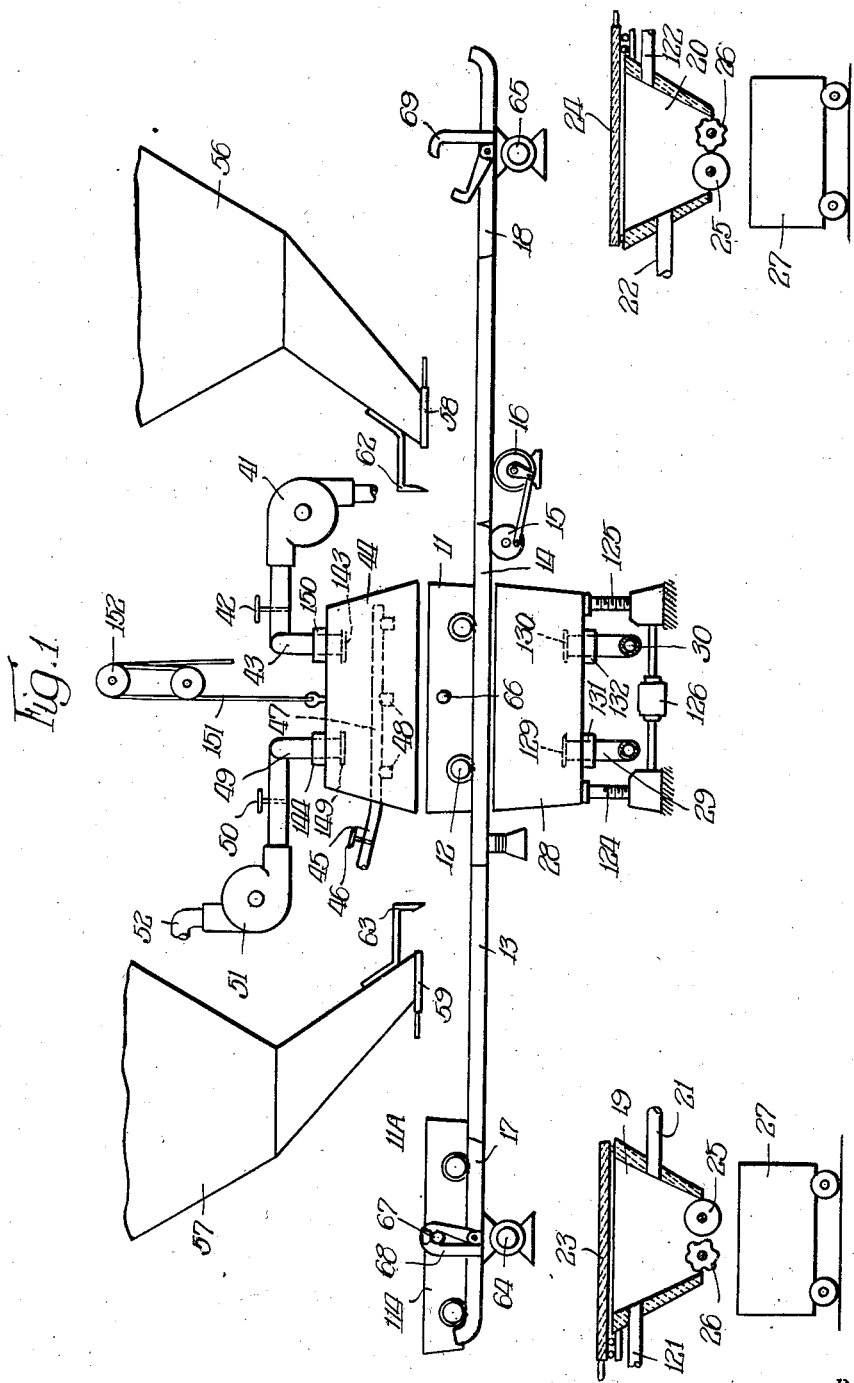
Figure 1 is a diagrammatic elevation of a form of apparatus using a movable tray.
Figure 2:
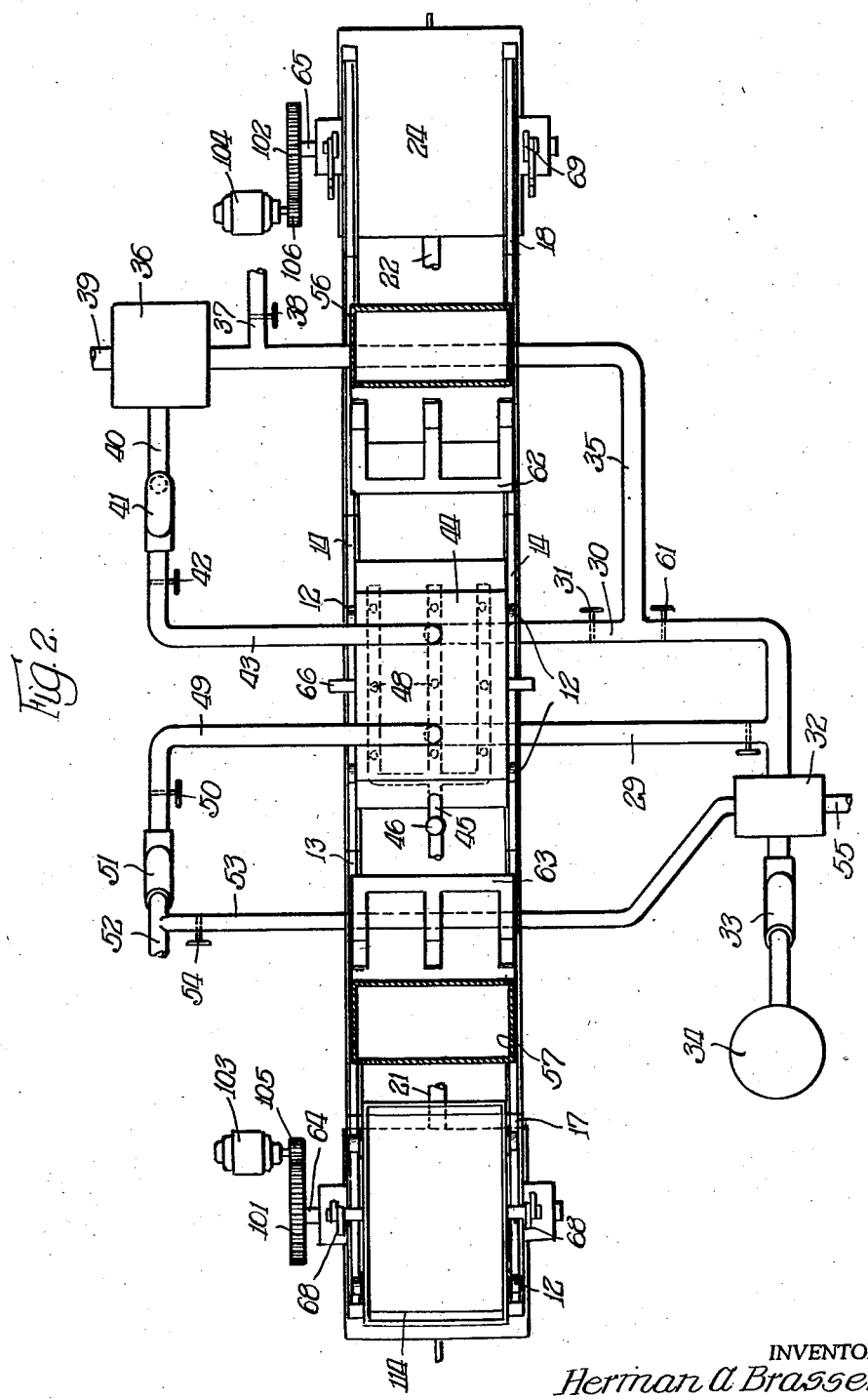
Figure 2 is a plan view of the form of apparatus shown in Figure 1.

Referring first to the form of apparatus shown in Figures 1 and 2, the tiltable and movable pan 11 is carried by rollers 12 on the track 13. Two pans are normally used and the second pan 11—A is shown at the left of Figure 1. The track 13 is provided with the central section 14, which may be vibrated by the eccentric 15 driven by the motor 16. The track has opposite end portions 17 and 18 which may be rotated about trunnions 64 and 65, respectively, to discharge the pans over the hopper-shaped heating furnaces 19 and 20, respectively. As shown in Figure 2, the trunnions 64 and 65 are provided with gears 101 and 102 driven by motors 103 and 104 by means of gears 105 and 106. The pans 11 and 11—A are provided with trunnions 66 and 67, respectively, by which they may be locked to the rotatable track sections by means of the pairs of locking arms 68 and 69, respectively. It will be understood that the trunnions 66 and 67 also may be used when handling the pans by means of cranes or the like, and that the locking arms will normally be power operated.

The hopper furnaces 19 and 20 are provided with insulated walls and with passages 21 and 22, respectively, through which hot neutral or reducing gases may be introduced into the hoppers. Passages 121 and 122 are provided for carrying off the gases. These hopper furnaces are provided with the movable covers 23 and 24, which may be maintained in place except during the introduction of treated material into the furnaces. The bottoms of the furnaces are provided with rolls 25 and 26, which serve to compact and form the treated material. Cars 27 may be run below the rolls to carry away the material after it is treated and formed.

The draft hood 28 is located immediately below the pan 11 or 11—A when that pan is at its central or operating position. This hood 28 is provided with passages 29 and 30 leading from its lower side for the purpose of carrying away or introducing gaseous fluids for the purpose of carrying on the desired treatment. The hood 28 is supported on vertical jack shafts 124 and 125 driven by means of motor 126, by means of which the hood may be raised and lowered so that it may make substantially gas-tight connection with the pan car 11 or 11—A during the operation and be disengaged from the cars during their removal and replacement. In order to permit this movement of the hood, the passages 29 and 30 are shown with ends 129 and 130 extending into the hood 28, the hood being provided with collars 131 and 132 making sliding contact with the passages.

As shown in Figure 2, the passage 30 leads past valves 31 and 61 to the recuperator 32, from which gas passing through the passage may be drawn by suction blower 33 and delivered to the stack 34. The passage 30 also connects with branch 35 which leads to the apparatus 36. This apparatus 36 may be a continuous slagging gas generator or any other suitable generator which may be used for reforming and reheating the reducing gases used in the process. The side passage 37 controlled by valve 38 connects to passage 35, and may be used for withdrawal of a portion of the spent gases. The intake passage 39 connects into the apparatus 36 through which additional fresh gases may be introduced into the circulation.

The offtake passage 40, leading from apparatus 36, connects through fan 41 and valve 42 to passage 43 leading to the upper hood 44. This hood 44 has a gas intake pipe 45 leading therein, this pipe being controlled by valve 46 and being connected to any suitable source of combustible gas. Within the hood are the branch pipes 47 having the downwardly directed burners 48, so spaced as to enable covering the entire area of the pan 11 with flame. The large gas or air passage 49 connects with the upper part of the hood 44 leading through valve 50 to the blower 51. The intake passage 52 of this blower has a cross connection 53 extending therefrom, this cross connection being controlled by valve 54 and extending over to recuperator 32. The recuperator 32 is provided with the intake passage 55, through which air or other gas to be heated by the recuperator is introduced. The passages 43 and 49 have extensions 143 and 149 into the hood 44, which is provided with collars 144 and 150 making sliding fit with the passages. The hood 44 is provided with the cable 151 and pulley 152 by means of which it may be raised and lowered to make contact with the pan cars 11 and 11—A.

The feed hoppers 56 and 57 are located on opposite sides of the hoods, having their lower ends located above the level of the tops of the pans 11 and 11—A. These hoppers are shown as provided with gates 58 and 59 and with leveling scrapers 62 and 63 to level off the material on the pan as it is moved from under the hoppers to the operating position between the hoods. It will be understood that this entire showing is somewhat diagrammatic and that the hoods and pans will be so designed and related as to provide an effective closure between the hoods and the pans in the operating position.

Figure 3:
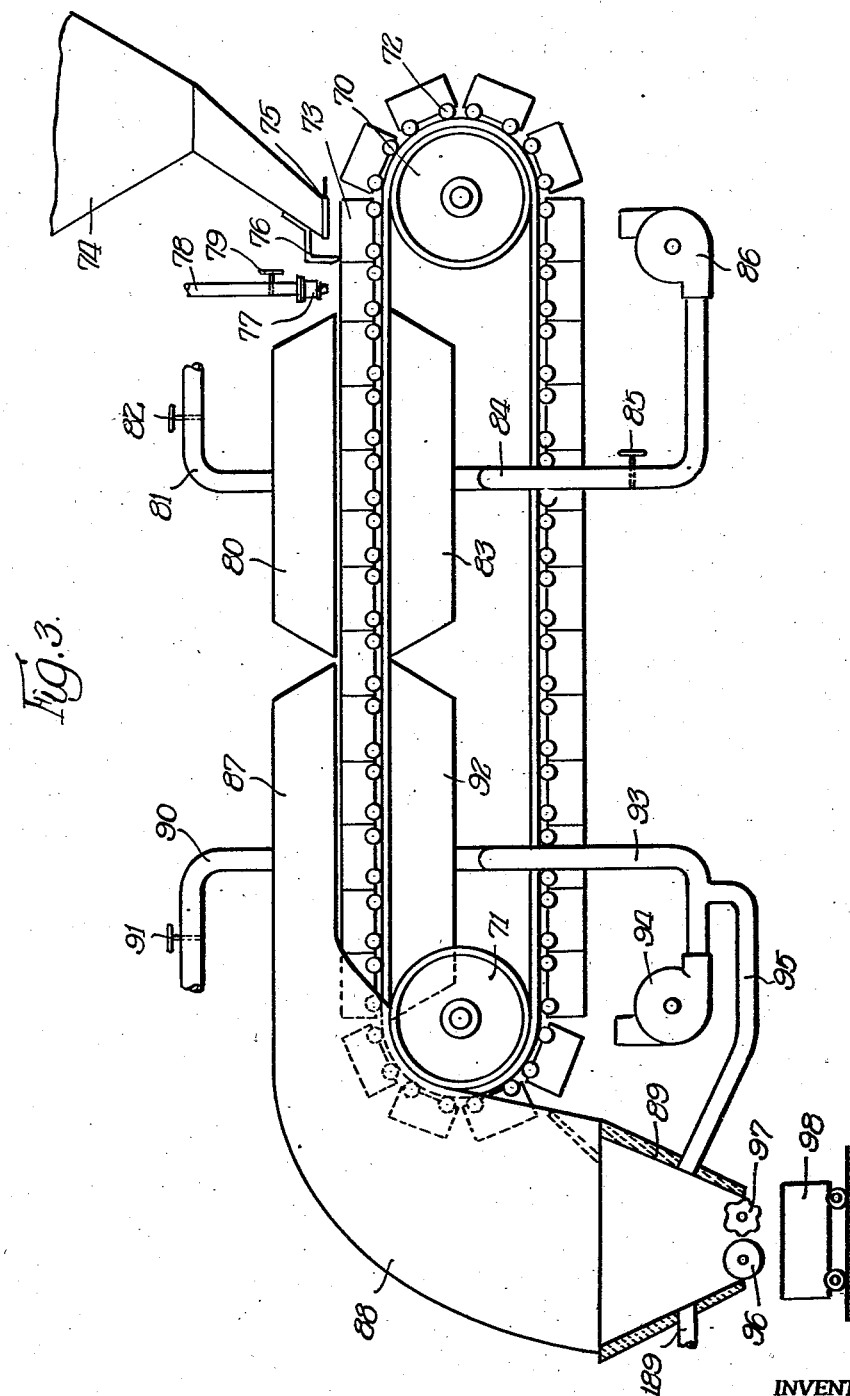
Figure 3 is a diagrammatic elevation of a form of apparatus using a continuous conveyor.

Referring next to the form of apparatus shown diagrammatically in Figure 3, the apparatus is generally similar to the continuous sintering machines now in use. The sprocket wheels 70 and 71 carry a continuous chain 72 made up of a plurality of connected pans or grates 73. The sprocket 70 may serve as a drive wheel and be driven by any suitable power apparatus. The feed hopper 74 is placed with its bottom controlled by a door 75 located above the chain of pans or grates. It will be understood that in operation of the apparatus, the sprocket wheels 70 and 71 will be rotated in the counterclockwise direction, carrying the upper pans or grates from right to left. The leveling bar 76 is carried adjacent the bottom of the hopper 74. The burner 77 is located to the left of the bar 76 and provided with fuel through pipe 78 controlled by valve 79. The hood 80 is located above the first portion of the grate travel and provided with passage 81 controlled by valve 82, which passage is used for introducing gases or air for the first or roasting step in the cycle of operations. The hood 83 is located immediately below and co-extensive with the hood 80, and is provided with the offtake passage 84 controlled by valve 85 and leading through fan 86. It will be understood that the hoods and pans or grates are so designed as to provide a substantially gas-tight connection between them as the grates travel between the hoods.

The left portion of the continuous grate is covered by a hood 87 having an end portion 88 extending downwardly to close the upper portion of the receiving hopper 89. The upper portion of hood 87 is provided with the intake passage 90 controlled by valve 91, this passage serving for the introduction of the gaseous re-agents for the reducing step in the cycle of operations. The hood 92 is located below the horizontal portion of the upper hood 87 and is connected by passage 93 to fan 94. The hopper furnace 89 is also connected by passage 95 to the intake side of the fan 94. As shown, the hopper 89 is provided with insulating walls and with a passage 189 through which additional gases at a higher temperature may be introduced to complete the reduction and prepare the reduced metal for the forming operation. The hopper furnace 89 is provided with the forming rolls 96 and 97 at its lower end. The car 98 is shown as run under the forming rolls 96 and 97. It will be understood that this form of apparatus may be provided with connections to recuperators for heating the gases by means of heat derived from the outgoing gases of the process, and also with gas generators or similar apparatus for reforming and reheating the gases used in the reducing step in the same general manner as is shown in Figures 1 and 2.

In carrying out my improved method by use of apparatus of the character shown in Figures 1 and 2, it will be understood that the pan 11 has a perforated, slotted or permeable hearth similar to forms of apparatus which have been heretofore used for sintering of iron ore. The pan will first be filled evenly with a raw material by means of one of the hoppers 56 and 57. This raw material may comprise, to give a single example, iron ore mixed with a small percentage of carbon, or without such admixture. If carbon is used, it will be finely divided and may be on the order of 3% of the total material to be treated. It is to be understood that several kinds of ores can be used, mixed together or with other oxides or compounds, for the purpose of producing a finished product having specified qualities and/or for promoting and accelerating reduction and desulphurization. Such mixtures should be uniformly combined or may be definitely stratified. The material particles in successive layers may have different chemical and physical properties, but within each of them the size and shape of the particles should be as uniform as is commercially practical in order to make the bed evenly permeable to the oxidizing and reducing gases used in the process. The materials can be bedded in stratified layers by means of multiple hoppers. For instance coarser materials should be deposited in a layer next to the grate, whereas the finest materials might advantageously be charged on top of the bed. Fine carbon, as well as special materials for promoting reduction, such as soda ash, should be charged on top of the roasted ore before starting the reducing cycle.

As soon as the material is charged into the pan, it is leveled off by being drawn under the associated leveling bar 62 or 63 and moved over to a position between the hoods 28 and 44. The hoods 28 and 44 are then raised and lowered, respectively, to make substantially gas-tight contact with the pan. The suction blower 33 is placed in operation to provide a downdraft suction through the hood 28, and the blower 51 may also be operating to drive air with or without additional hot gases down through the hood 44. The combustion gas is introduced through pipe 45 by opening valve 46 and the gas burners 48 are lighted. The draft pulls the flame and products of combustion down upon the bed of material being treated. If sufficient solid fuel in the form of carbon or sulphur is contained in the bed of ore to carry on the roasting process without the addition of external heat from hot combustion gases, the combustion gases may be turned off as soon as the combustion of the solid fuel has been fully started and thereafter air alone may be used.

If desired, the air used for burning the gas or the carbon in the charge may be preheated by being drawn through recuperator 32, where it derives heat from the products of combustion, passing out on the lower or suction hood 28.

The purpose of this roasting cycle is to remove moisture or chemical water and volatile matter, such as carbon dioxide or chlorine or sulphur, arsenic or other objectionable elements which may be removed under the conditions of the roast. The roasting cycle also serves to open up the pores in the grains of material in the case of magnetites or specular or other dense hematites, to render them more easily reduced. If desired, vibration may be applied to the pan to insure more intimate contact between the gases and solids during the process. This may be carried on in the form of construction shown by means of the motor 16 which rotates eccentric 15 to vibrate the central section 14 of the track.

As soon as the roasting cycle is completed, the flow of the heated gases through the bed is stopped by closing valve 50. Immediately after the stopping of the roasting cycle, reducing gases are supplied to the hood 44 through passage 43, and are drawn down through the roasted bed of material by the suction blowers. The blower 33 draws out any portion of the gases sent to stack 34, while blower 41 pulls the new gases or reformed gases through the apparatus 36. The valves in the system may be adjusted so that any desired portion of the reducing gases may pass to the stack or to the reforming apparatus 36 for return to the material being treated. A bed of incandescent carbon in the apparatus 36 may serve, for example, to revert the $CO_2$ to $CO$ and the $H_2O$ back to $H_2$ and $CO$. Distribution and contact between the reducing gases and the solid material may also be assisted by applying vibration to the pan during the action of the gases.

As soon as the reducing cycle is completed, the pan 11 may be moved laterally to a position upon the section 18 of the track to the right where, with the cover 24 removed from the hopper 20, the material while still hot from the process is dumped with the least possible loss of time in order to bring the material into the finishing operation with the least possible loss of temperature and preferably with an increase of temperature by the addition of heat to the hopper-shaped furnace. This heat can be supplied by the combustion of spent gases or any other suitable fuel. The completion of the process is the squeezing or compressing by rolling or extruding of the hot reduced material while hot from retaining the temperature of the roasting and reducing cycles as fully as possible or practical, and from the further heat which may have been added. The cover 24 is slid back over the hopper 20 as soon as the material is in the hopper-shaped furnace, and hot reducing or neutral gases may be introduced through passage 22 to maintain or increase the heat and obtain the desired degree of reduction. The bottom of the hopper 20 is shown as closed by a pair of opposed rolls 25 and 26, and these may be rotated to form and compress the material and pass it out of the hopper in solid form. Instead of one pair of rolls, multiple pairs may be used to conform to the shape of the hopper. The shape of the material depends on the shape of the rolls, which may vary as desired. In place of rolls other suitable means of compacting may be used.

If the purpose of the operation is to produce a melting stock for use in open hearth, electric and other furnaces, then rolls of this type are the simplest means for compacting the reduced material. By giving the rolls the same length as the pan and favorable diameter, they will be able to handle the amount discharged into the hopper without difficulty in time with the cycle of operations. To give somewhat specific examples, if the charge is then tons and the yield of reduced metal is 70%, then seven tons would be handled by the rolls in each cycle. The roasting and reducing operations will require approximately twenty minutes each, with a depth of bed in the pan of approximately twelve inches.

As shown in the drawings, the operating unit preferably consists of two pans, so that while one pan is in operation first under oxidizing and then under reducing gases, the other may be dumped, cleaned, re-charged with material and placed in position for processing. The oxidizing and reducing treatment will consume about twenty minutes each, which would allow 40 minutes for dumping and preparing the other pan and having it ready to pass under the hood as soon as the treatment of the material in the other pan is completed. This time cycle would provide a large margin of time for the final reducing and compacting in the hopper-shaped furnace, which is of advantage if it is desired to give a definite shape to the finished product, for example, by having two or more sets of rolls in tandem with various grooves in the rolls to produce the desired shape and size, or if it is desired to extrude the material through dies into rods or other forms involving large reductions in area and being therefore relatively slow in operation.

The improved process is carried on in the form of apparatus shown in Figure 3 in the same general manner as described above in connection with Figures 1 and 2. The material to be treated is fed from hopper 74 into the pan 73 by proper control of the hopper door 75. The material is leveled off by the leveling bar 76, and as it passes under the burner 77 the burner flame ignites the carbon on top of the bed. If no carbon is used in the charge, the use of this burner is dispensed with. As the grates pass between hoods 80 and 83, the roasting operation is carried out. Heated air or products of combustion, or both, are passed down through passage 81 into the hood and drawn through the material being treated by draft created through passage 84 leading from hood 83. The heated products of combustion are drawn out by fan 86 and may be disposed of in any desired manner. They may be passed through recuperators in order to return some of the heat to the incoming gas or air if desired.

The reducing operation is carried on when the grates pass under hood 87, the heated reducing gases being introduced into the hood through passage 90 controlled by valve 91. These gases are drawn off by means of fan 94, which creates a suction through the passages 93 and 95. These gases may be reformed or treated in any desired manner and recirculated through passage 90 in the same general manner as described in connection with Figures 1 and 2. The material in the pans is dumped from the grates as the grates pass over the sprocket 71, and pass downwardly through the reducing gas stream into the hopper furnace 89, where they are still maintained under reducing atmosphere due to the extension 88 of hood 87. Additional heat may be supplied in the hopper furnace 89, through passage 189, in order to complete the reduction at a higher temperature and prepare the metal for the forming operation. The material is formed by rolls 96 and 97 and carried away in car 98. The grates may be suitably cleaned and limewashed or otherwise treated as desired, as they pass along the return or lower run of the continuous grate system.

In order to prevent formation of silicates of the metals during the roasting cycle of the operation, which silicates are difficult to reduce, it is necessary with most ores to control and hold down the temperatures of the material in the bed to a range of from approximately 1500 degrees F. to 1800 degrees F. These temperatures will with most ores also prevent the material caking and sticking to the pan. The same temperature range applies for the reducing step but in order to have the material more completely reduced and at a proper temperature for compacting by means of the rolls or other apparatus at the end of the process, it may with certain ores be found desirable to raise it to 2000 degrees F. and even higher. This raise in temperature may take place after partial reduction toward the end of the reduction treatment on the hearth, while the ore is still being subjected to downdrafting of reducing gases. If this is not found desirable with the particular material or apparatus being used, the temperature can be raised after the material is discharged from the pan or conveyor. In that case the temperature may be raised by the combustion of fuel in a reducing atmosphere after the material is placed in the hopper furnace above the rolls or other compacting apparatus.

The reduced material may also have its temperature raised by passing through a chamber heated by electricity, which may be equipped with heating coils or other electric means to transmit additional heat to the hot reduced ore by radiation or conduction. In case the increased temperature is obtained either in the bed at the end of the reduction cycle or in the hopper furnace after dumping, the temperature may be obtained by utilizing spent reducing gases by preferably increasing their temperature in a recuperation or regeneration step or by mixing them with fresh fuel or by both means. The temperatures throughout the process are preferably automatically controlled by any of the well known systems and apparatus of combustion and heat control.

It will be understood that the several forms of apparatus shown and described are somewhat diagrammatic indications of suitable apparatus for carrying out the process. It may be carried out in other forms of apparatus, either of batch or continuous type, as, for example, in separate pans which are handled by cranes or conveyors and moved to different points for charging or for the roasting step, the reduction step, and for dumping the material. The shape of these pans is not material and they may be square or rectangular or circular in plan, depending upon the circumstances and the particular apparatus with which they are used. With the pan cars shown in Figures 1 and 2 of the drawings, or with other types of pans, it is important to prevent loss of heat and oxidation in the open air, and suitable tight-fitting covers may be applied to the pans during their movement between different stages of the operation. Both the forms of apparatus and the method and process are capable of wide modification to meet different conditions and requirements. Instead of the sintering machine type of travelling hearth, a ring-shaped or circular hearth may be used. In place of the hopper-shaped furnace sealed at the bottom with compacting rolls, a heating furnace of the batch or the continuous type may be used, charged by a suitable type of conveyor and discharged for instance by a roller conveyor feeding the hot material into compacting rolls. It must also be understood that one or the other step may be omitted in the operation with certain ores, for instance the roasting step may not be required, in which case preheat before reduction may be derived from the combustion of solid fuel or from the heat of the reducing gases alone. Also reheating before compacting may in certain cases not be required. It is also understood that compacting of the material into solid form may be followed by a further reheating step and any kind of mechanical forming for making various shapes and kinds of finished products. By using a larger number of pans and increasing their size, tonnages comparable to those made in blast furnace and steel plants may be realized, and if moving hearths are used, their greater length and width as well as a greater number of machines will give any production desired. I contemplate, therefore, such variations as come within the spirit and scope of the appended claims.

What is claimed is:

1. The process of producing metals from their ores which comprises roasting the ores while in a finely divided state by downdrafting hot oxidizing gases through them, producing temperatures such as to partially sinter the finer material, and thereafter downdrafting reducing gases through them.

2. The process of producing solid metallic stock from metallic ores, which comprises roasting and simultaneously only partially sintering the ores, immediately reducing the roasted and partially sintered ores while still hot from the roasting step, and compacting the product of the reduction step while still hot from the process to form a coherent mass.

3. The process of producing solid metals from their bedded ores, which comprises roasting and simultaneously only partially sintering the bedded ores, immediately reducing the roasted and partially sintered ores while still hot from the roasting step by adding additional heat by downdrafting heated reducing gases through the material, and compacting the product of the reduction step while still hot from the process to form a coherent mass.

4. The process of producing metals from ores, which comprises mixing and bedding the ores together with a relatively small amount of finely divided carbon, igniting the carbon, roasting and partially sintering the ores by passing hot oxidizing gases through them, thereafter passing hot reducing gases and alkaline fumes through the roasted material while still hot from the roasting step in the process, and while still hot from the reduction step compacting the reduced material into any desired shape.

5. The process of producing metals from their ores, which comprises subjecting them to a roasting treatment by downdrafting oxidizing gases through them at a temperature such that the material is maintained below the temperature of fusion and formation of silicates difficult to reduce, and thereafter to a reducing treatment by downdrafting reducing gases through them at sufficiently high temperatures to effect extensive reduction but below those at which partially reduced particles fuse together with the gangue forming compounds difficult to reduce, then raising the temperatures to a point such that the particles become substantially completely reduced and may be formed into solid metallic bodies by compression, and compacting the reduced material into desired shape.

6. The process of producing metals from their ores, which comprises subjecting them to a roasting treatment by downdrafting oxidizing gases through them and thereafter to a reducing treatment by downdrafting reducing gases through them at temperatures below those at which the partially reduced metallic particles frit together and form solid masses, then raising the temperatures to a point such that the reduction becomes more nearly complete and that the particles may be formed into solid bodies by compression, and compacting the roasted and reduced material into solid form.

7. The process of producing metals from their ores, which comprises first roasting the ore in finely-divided state by passing hot roasting gases therethrough, then partially reducing the roasted ore by passing reducing gases therethrough at reducing temperatures, further reducing the ore by causing it to fall by gravity through hot reducing gases, substantially completing the reduction of the material at higher temperatures by passing reducing gases therethrough, said roasting and reduction operations being conducted at temperatures below those at which the particles agglomerate or frit together, and said reduction operations being conducted in a substantially continuous stream of reducing gases, and compacting the reduced material into self-sustaining units while still hot from the reducing operation and in a reducing atmosphere, said roasting, reducing and compacting operations being conducted as a continuous process.

8. The process of producing metallic units from ores without fusion thereof in a closed system, which comprises introducing the ore in finely-divided state into the system, maintaining a current of hot reducing gases in the system, passing said current of gases through a bed of the ore at one stage in the system to partially reduce the same, discharging the ore from said one stage to another stage through said current of gas by gravity to further reduce the same, substantially completing the reduction of the ore in said other stage by treating the same with said gas at higher temperatures but below those at which the particles agglomerate or frit together, and compacting said reduced material into self-sustaining units while still hot from the reducing operations and in a reducing atmosphere.

9. The process of producing metallic units from iron ores without fusion in a closed system, which comprises introducing the ore in finely-divided state into the system, maintaining a current of hot hydrogen-containing gases in the system, progressively reducing the ore by passing the said gaseous current therethrough at successive stages in the system, at least one stage comprising reducing the ore as it falls by gravity through said gaseous current, maintaining a higher temperature in the final reduction stage but below temperatures at which the particles agglomerate or frit together, and compacting the resulting reduced material into self-sustaining units while still hot from the final reducing stage and in a reducing atmosphere, the several steps being conducted as a continuous process.

10. The process of producing metals from their ores, which comprises maintaining a substantially continuous bed of the ore in finely-divided state, together with an alkaline compound in finely divided state in a reduction zone, continuously passing hydrogen-containing gases transversely through the bed at temperatures sufficient to effect reduction of the ore and reaction between the same and said alkaline compound but below temperatures at which the particles agglomerate or frit together, causing the bed to advance through said zone while treated by said gases, and compacting the resulting reduced material after passing through said zone into self-sustaining units while still hot from said reducing operation and in a reducing atmosphere, the several steps being conducted as a continuous process.

HERMAN A. BRASSERT.